March 4, 1952 — E. CAMERINO — 2,587,819
UNIVERSAL COUPLING
Filed Oct. 6, 1948
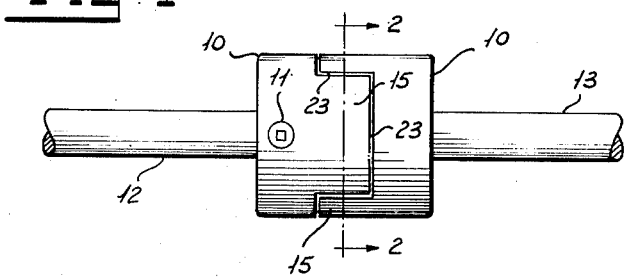
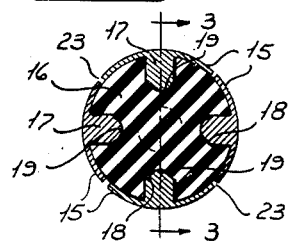
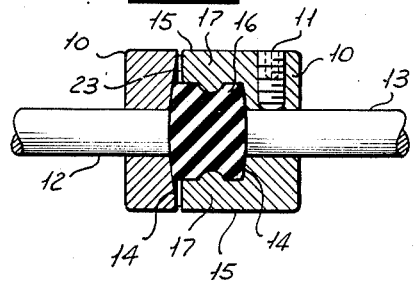
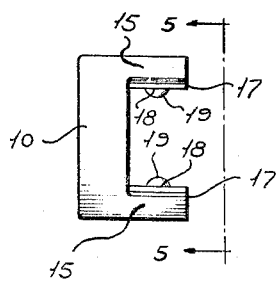
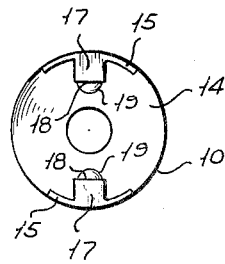
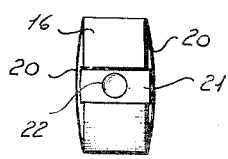
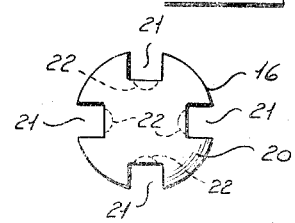
INVENTOR.
Ernest Camerino,
BY Robert F. Beck
ATTORNEY Patented Mar. 4, 1952

2,587,819

UNITED STATES PATENT OFFICE 2,587,819

UNIVERSAL COUPLING

Ernest Camerino, New York, N. Y.

Application October 6, 1948, Serial No. 53,065

6 Claims. (Cl. 64—14)

My invention relates to couplings and more particularly to flexible couplings for attachment to the ends of line driven shafts to effect unitary rotation of the shafts.

In some of the arts, for instance, oil burners, refrigerating apparatus, washing machines, pumping machinery, and similar machine assemblies, couplings are employed for connecting line driven shafts together for unitary rotation. Inasmuch as it is not always practical, in many assemblies, to dispose the shafts in coaxial alignment without considerable difficulty and expense, it is customary to provide flexible couplings for connecting the shafts together, some examples of flexible couplings being disclosed in United States Patents Nos. 1,417,432; 2,022,626 and 2,295,003.

While various types of flexible couplings heretofore developed for connecting the shafts for unitary rotation may be deemed as constituting an advance in the art, they have not proven entirely satisfactory and have failed to solve the problem in its entirety, one of the numerous reasons being that not a single type of coupling, so far as I am aware, embodies in a simple, durable, efficient and economical construction, such desirable and essential features as the facility for connecting aligned or misaligned shafts together, absorption of shocks and vibrations, reduction of power loss to a minimum, and the elimination of noise, chatter, rotative lag, heating occasioned by component coaction, complex assemblies and mountings, component distortion to any appreciable degree, vexatious precisional adjustments, use of special tools in assembling, readjustments after initial installation, appreciable lost motion, undesired or accidental disassemblement of components before and after installation, highly complicated construction and hazardous projecting surfaces or parts, and the necessity of employing only highly skilled workmen for installation and servicing.

One of the objects of my invention is to provide a coupling which is so constructed and arranged as to embrace and embody substantially all of the foregoing described desirable and essential features.

Another object of my invention is to provide a flexible coupling which is simple in construction, durable in use, efficient in operation, economical in manufacture, and lends itself to ready installation.

A further object of my invention is to provide a coupling of the foregoing described character wherein the components, when assembled, are maintained in assembled relation against accidental displacement or detachment.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a side elevation of a coupling constructed in accordance with my invention.

Figure 2 is a sectional view taken on the line 2—2 of Figure 1.

Figure 3 is a sectional view taken on the line 3—3 of Figure 2.

Figure 4 is a side elevation of one of the sleeves or components.

Figure 5 is an end elevation of the component disclosed in and viewed as indicated by the line 5—5 of Figure 4.

Figure 6 is a side elevation of the interjacent component.

Figure 7 is an end elevation of the component disclosed in Figure 6.

In practicing my invention, as illustrated in the drawing, I provide a pair of metallic heads, collars or end components 10 which are suitably secured, as by set screws 11, to the adjacent ends of driving and driven shafts 12 and 13, respectively. The heads are provided with cylindrical side faces and are formed with openings extending through their radial faces for receiving the ends of the shaft.

The confronting or adjacent radial faces of the heads 10 are slightly concave to provide relatively shallow pockets 14 and are fashioned with axially extending pairs of flanges 15, the flanges of each pair being disposed in spaced and opposed relation and provided with inner and outer arcuate faces with the latter faces merging with the peripheral face of the head. When the heads are operatively coupled to the shafts, the flanges of one head are disposed in staggered, circumjacent and interfitting relation with the flanges of the other head to define a cage which embraces an interjacent component 16 constituting a power transmitting member or cushion, the latter being constructed of rubber or other suitable elastic material, thereby enabling it to absorb shock and noise.

The inner arcuate face of each of the flanges 15, is provided with an axially extending rib or key 17 having a pair of side faces and an inner face 18 disposed between the side faces, the inner face being provided with a hemispherical projection or boss 19. The component 16 is of a substantially cylindriform configuration and is formed with convex end faces 20 for seating within the pocket 14 of the heads. The peripheral face of the component is formed with a quaternary of spaced axially extending channels, keyways or slots 21 in which the ribs 17 are disposed, the circumference of the component 16 being defined by the inner arcuate faces of the flanges 15 when in assembled relation as clearly illustrated in Figure 2.

Within the confines of each of the slots 21, the component 16 is formed with a hemispherical recess 22 receiving the projection 19 of the rib 17 disposed in the respective slot. When in assembled relation, the flanges are so dimensioned as to define a relatively narrow space or interflange 23 therebetween and between the radial faces of the flanges and the adjacent head as clearly illustrated in the drawing whereby to permit relative universal movement of the heads when the shafts are misaligned. Inasmuch as the space 23 is relatively narrow, the component 16 is confined within the cage against outward displacement due to distortion when compressed during operation, thereby insuring retention not only of the ribs within the slots, but the projections 19 within the recesses 22.

In use, the heads 10 may be loosely applied to the shafts 12 and 13 to permit the component 16 being inserted between the shaft ends. When the component is thus positioned, the heads are manipulated in a manner wherein the flanges 15 embrace the components 16 and thus cage the latter therein whereupon the set screws are adjusted to secure the heads in fixed relation with the shafts, respectively. When the shafts are thus connected by the coupling, the component 16 functions to transmit rotary movement between the heads, it being understood that the ribs 17 of the heads are seated within the channels 21 with the projections 19 disposed within the recesses 22. The projections function to restrain axial displacement of the components with respect to each other, it being understood that the component 16 is of a sufficient yieldability to permit universal movement of the heads when the shafts are disposed in misalignment. Furthermore, inasmuch as the component 16 is constructed of rubber or the like, heating occasioned by component coaction is eliminated. Obviously, my novel form of coupling, by its unique and simple construction, serves to provide a coupling in which the heretofore described desirable and essential features are present.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined to the herein described use therefore as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In a coupling of the class described, a pair of head components adapted to be connected to a pair of shafts in fixed relation therewith respectively, and provided with axially extending arcuate flanges and with the flanges of one component being disposed in alternate and circumjacent relation with the flanges of the other component and thus defining a cylindriform cage between said components, a cylindrical flexible component disposed in said cage, said flanges and said flexible component being provided with connecting means for securing them together to effect unitary rotation of said head components, said flanges surrounding said flexible component and coacting to restrain appreciable distortion of said flexible component for maintaining said means effective.

2. In a coupling of the class described, a pair of heads adapted to be connected to a pair of shafts in fixed relation therewith respectively and provided with axially extending flanges and with the flanges of one head being disposed in alternate and circumjacent spaced relation with the flanges of the other head and the latter to permit universal movement of said heads and to define a cage between said heads, an elastic member disposed in said cage, said flanges and member being provided with coacting ribs and channels for securing said heads and member together to effect unitary rotation of said heads, said flanges surrounding said member and coacting to restrain appreciable distortion of said member to maintain said ribs effective within said channels, said ribs and said member equipped with retaining means for restraining axial displacement of said heads relative to said member.

3. In a coupling of the class described, a pair of heads adapted to be connected to a pair of shafts in fixed relation therewith, respectively, and provided with axially extending flanges and with the flanges of one head being disposed in alternate and circumjacent spaced relation with the flanges of the other head to permit relative movement therebetween and to define a cage between said heads, an elastic member disposed in said cage and formed with channels, said flanges being provided with ribs disposed in said channels to effect unitary rotation of said heads and said member, said flanges surrounding said member and coacting to restrain appreciable distortion of said member for maintaining said ribs in said channels, said ribs and said member equipped with retaining means for restraining axial displacement of said heads relative to said member, said heads having confronting concave faces and said member having convex end faces fitting said concave faces, respectively, to facilitate abaxial movement of the shafts during rotation.

4. In a coupling of the class described, a pair of heads adapted to be connected to a pair of shafts in fixed relation therewith respectively and provided with axially extending flanges and with the flanges of one head being disposed in alternate and circumjacent spaced relation with the flanges of the other head to permit relative movement therebetween and to define a cage between said heads, an elastic member disposed in said cage and formed with channels and a recess within each of said channels, said flanges being provided with ribs disposed in said channels to effect unitary rotation of said heads and said member, said flanges coacting to restrain appreciable distortion of said member for maintaining said ribs in said channels, said ribs being provided with a detent extending into said recesses to restrain axial displacement of said heads relative to said member.

5. A coupling of the class described, comprising, a pair of heads adapted to be connected to a pair of shafts in fixed relation therewith respectively, each of said heads having a radial face provided with axially extending spaced flanges and with the flanges of one face being disposed in circumjacent alternate relation with the flanges of the other face, said radial faces of said heads being concave and constituting pockets, each of said flanges being provided with an inwardly disposed rib formed with a hemispherical boss, a rubber member disposed between said heads and within the confines of said flanges, said member having convex ends seated within said pockets and formed on its side face with channels receiving said ribs whereby to effect unitary rotation of said heads, said flanges of one face being disposed in circumjacent spaced relation with the flanges of the other face and the latter to permit universal movement of said heads when connected to misaligned shafts, said flanges coacting with said faces to restrain appreciable distortion of said member and thus maintain said ribs effective within said channels, said member being provided with recesses within said channels and accommodating said bosses to restrain axial displacement of said heads relative to said member.

6. In a coupling of the class described, a pair of opposed cylindrical coupling members adapted to be connected to a pair of shafts in fixed relation therewith and formed with confronting end faces having circumferential walls extending axially from said faces, a cylindrical contortable member disposed within the confines of said walls and having end faces engaging said first mentioned end faces in paired relation therewith and with the faces of each pair being of a concavo-convexity, connecting means connecting said walls to said contortable member and effective for restraining axial displacement of said member and for rotating the latter in unison, said walls being disposed in circumjacent relation about said contortable member to restrain appreciable distortion of said contortable member and thus maintain said connecting means effective.

ERNEST CAMERINO.

REFERENCES CITED

The following references are of record in the file of this patent:

UNITED STATES PATENTS

| Number | Name | Date |
|---|---|---|
| 1,417,432 | Walker | May 23, 1922 |
| 1,460,869 | Thropp | July 3, 1923 |
| 1,646,427 | Skidmore, Jr. | Oct. 25, 1927 |
| 1,669,931 | Dowrie | May 15, 1928 |
| 1,992,528 | Geyer | Feb. 26, 1935 |
| 2,022,626 | Weis | Nov. 26, 1935 |
| 2,135,634 | Byron | Nov. 8, 1938 |
| 2,208,547 | Murphy | July 16, 1940 |
| 2,295,003 | Natkins | Sept. 8, 1942 |